(12) United States Patent
Nishida et al.

(10) Patent No.: US 6,886,945 B2
(45) Date of Patent: May 3, 2005

(54) PROJECTOR

(75) Inventors: Kazuhiro Nishida, Matsumoto (JP); Katsuyuki Uehara, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/795,330

(22) Filed: Mar. 9, 2004

(65) Prior Publication Data

US 2004/0201826 A1 Oct. 14, 2004

(30) Foreign Application Priority Data

Mar. 11, 2003 (JP) .......................... 2003-064400

(51) Int. Cl.[7] .............................................. G03B 21/14
(52) U.S. Cl. ...................................................... 353/97
(58) Field of Search ............................ 353/38, 88, 95, 353/97, 75; 349/5, 7, 8, 9

(56) References Cited

U.S. PATENT DOCUMENTS 5,098,184 A * 3/1992 van den Brandt et al. .. 353/102

6,726,334 B2 * 4/2004 Ishino .......................... 353/84

FOREIGN PATENT DOCUMENTS

JP          A-303085          11/1993

* cited by examiner

*Primary Examiner*—William C. Dowling
(74) *Attorney, Agent, or Firm*—Oliff & Berridge, PLC (57) ABSTRACT

A projector is provided to ensure the enhancement of contrasts while reducing the needs for alignment accuracy. The projector includes a light source, a first lens array, a second lens array, a superimposing lens, and a projection lens. The first lens array splits light emitted by the light source into a plurality of partial light beams with a plurality of small lenses that are arranged in a matrix. The second lens array includes a plurality of small lenses corresponding to the plurality of small lenses of the first lens array. The superimposing lens superimposes a plurality of partial light beams emitted by the first lens array and the second lens array on a liquid crystal panel. The projection lens projects light modulated by the liquid crystal panel. In the projector, a diaphragm having an opening that is shaped to be nearly similar to the outline of the second lens array is provided in the vicinity of an area conjugated with the second lens array.

7 Claims, 10 Drawing Sheets

PROJECTOR

BACKGROUND OF THE INVENTION

1. Field of Invention

The present invention relates to a projector.

2. Description of Related Art

Projectors have been developed with an aim to enhance their contrasts. Some projectors are provided with a diaphragm in a projection lens. For example, a related art projector is disclosed in Japanese Unexamined Patent Application Publication No. 5-303085. According to the document, a projection display device includes a lighting apparatus, a device to incorporate image data into light beams from the lighting apparatus by modulating the light beams, and a projection optical system that projects the modulated light beams on a screen. The lighting apparatus focuses light emerged from a light source lamp with a focusing device, forms at least one secondary light source, and illuminates the device to incorporate image data with light beams emitted from the secondary light source. The device to incorporate image data is a light bulb using a liquid crystal composite element that modulates incident light beams depending on the degree of diffusion. An image of the secondary light source is formed inside or in the vicinity of the projection optical system, where a projection diaphragm, that is perpendicular to the optical axis of the projection optical system, is provided. The shape of an opening of the projection diaphragm is nearly the same as the outline of the image of the secondary light source formed within an area including the projection diaphragm.

SUMMARY OF THE INVENTION

According to Japanese Unexamined Patent Application Publication No. 5-303085, only light beams forming the image of the secondary light source are allowed to be transmitted by making the shape of the projection diaphragm almost the same as the outline of the image of the secondary light source. This requires highly precise alignment of the lighting apparatus and the projector diaphragm. If they are not precisely aligned, various problems would occur that deteriorate picture quality, such as reduced brightness, a decrease in an illuminance ratio (a ratio of illuminance at the edge of a liquid crystal panel to illuminance at the center thereof) that shows the degree of illuminance evenness on an illuminated surface, and uneven color.

In consideration of this problem, the present invention provides a projector that ensures the enhancement of contrasts while reducing the needs for alignment accuracy.

A projector according to an aspect of this invention includes a light source, a first lens array, a second lens array, an superimposing lens, and a projection lens. The first lens array splits light emitted by the light source into a plurality of partial light beams with a plurality of small lenses that are arranged in a matrix. The second lens array includes a plurality of small lenses corresponding to the plurality of small lenses of the first lens array. The superimposing lens superimposes a plurality of partial light beams emitted by the first lens array and the second lens array on an optical modulator. The projection lens projects light modulated by the optical modulator. In the projector, a diaphragm having an opening, that is shaped to be nearly similar to the outline of the second lens array, is provided in the vicinity of an area conjugated with the second lens array. This configuration enables the projector to provide quality projected images with high contrasts by shielding light beams that lower contrasts with the diaphragm. Compared to related art projectors that require high alignment accuracy to transmit only secondary light source images, the projector according to an aspect of the invention does not require high alignment accuracy. It is sufficient to have the diaphragm in the vicinity of an area conjugated with the second lens array according to the invention. Therefore, it is possible to enhance contrasts without causing various problems that deteriorate picture quality, such as reduced brightness, a decrease in an illuminance ratio (a ratio of illuminance at the edge of a liquid crystal panel to illuminance at the center) that shows the degree of illuminance evenness on an illuminated surface, and uneven color.

In the projector according to an aspect of the invention, the opening of the diaphragm is almost rectangular in shape. This configuration enables the projector in which the outline of the second lens array is shaped to be a rectangle to provide quality projected images with high contrasts.

In the projector according to an aspect of the invention, the optical modulator includes a black matrix and serves as a diffraction grating. The diaphragm shields light passing through outside of a matrix of each light source image that is formed in an area conjugated with the second lens array by zero-order diffracted light of each of the partial light beams formed by the optical modulator. This makes it possible to enhance contrasts.

In the projector according to an aspect of the invention, the diaphragm includes the opening whose width $\Phi_X$ and length $\Phi_Y$ are determined by the formulas below, when seen from the direction of an optical axis of the light source:

$$\Phi_X = f/F_X;$$

$$\Phi_Y = f/F_Y.$$

Note that "f" refers to the focal length of a projection lens "$F_x$" refers to the horizontal F number of an illumination optical system including the first lens array, the second lens array, and the superimposing lens, when seen from the direction of the optical axis of the light source. "$F_Y$" refers to the vertical F number of the illumination optical system when seen from the direction of the optical axis of the light source.

In the projector according to an aspect of the invention, the diaphragm is made of a plate member having an opening. This makes it possible to economically provide the diaphragm.

In the projector according to an aspect of the invention, the diaphragm includes a mechanism so as to adjust an area of the opening. This makes it possible to provide projected images best suited for a place where the projector is used by adjusting the area of the opening depending on conditions under which it is used.

In the projector according to an aspect of the invention, the optical modulator is a liquid crystal panel including liquid crystal packaged between a thin-film-transistor (TFT) substrate and an opposing substrate that faces the TFT substrate. As the optical modulator, a liquid crystal panel including liquid crystal packaged between a TFT substrate and an opposing substrate facing the TFT substrate is used.

DETAILED DESCRIPTION OF EXEMPLARY EMBODIMENTS

Figure 1:
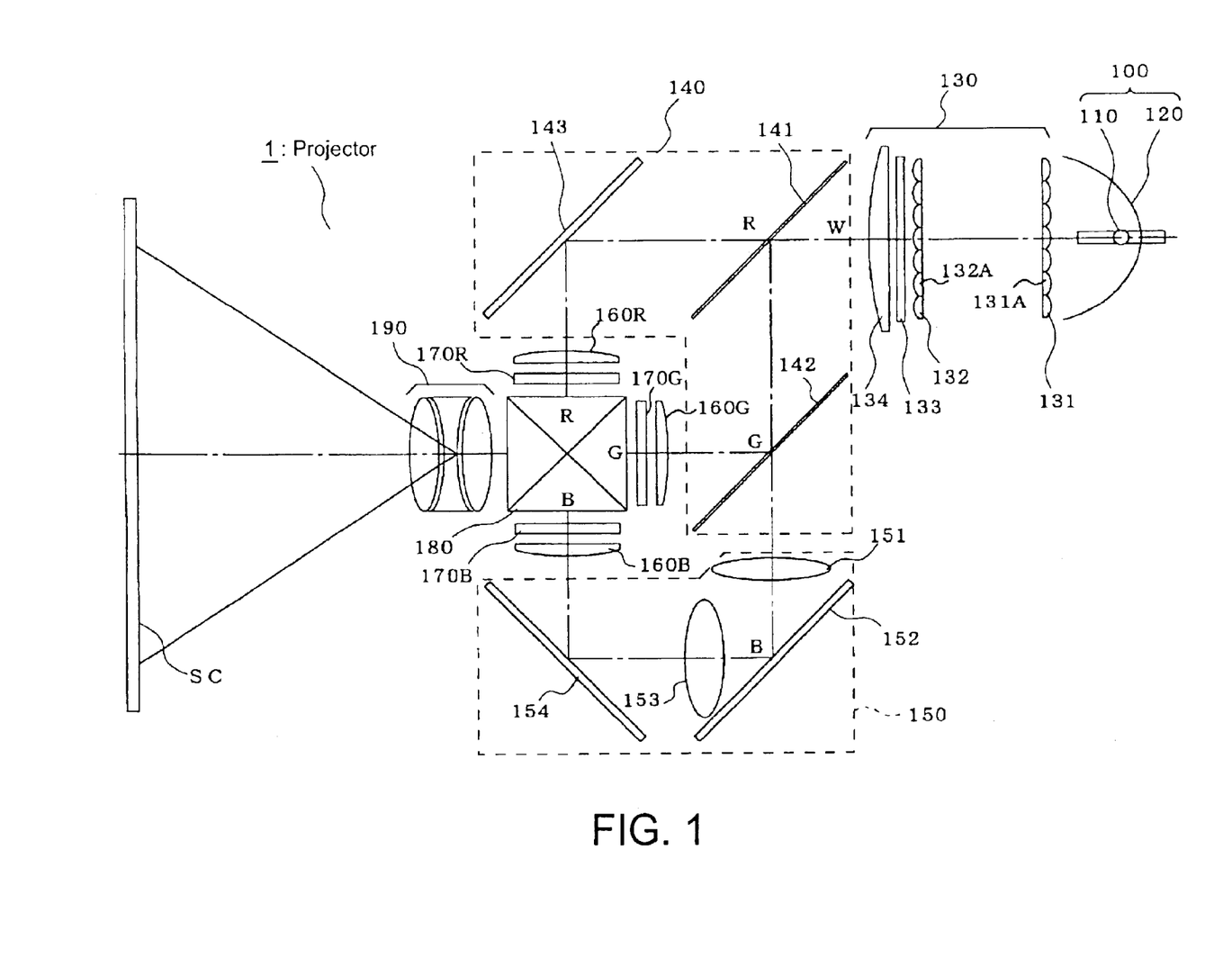
FIG. 1 is a schematic of an optical system of a projector according to an exemplary embodiment of the invention.

FIG. 1 shows an optical system of a projector according to an exemplary embodiment of this invention.

A projector 1 includes a light source 100, an illumination optical system 130, a color separation optical system 140, a relay optical system 150, three condenser lenses 160R, 160G, and 160B (collectively called a condenser lens 160 where describing matters common to the three), liquid crystal panels 170R, 170G, and 170B (collectively called a liquid crystal panel 170 where describing matters common to the three), a cross-dichroic prism 180, and a projection lens 190. The illumination optical system 130 equalizes the illuminance distribution of light emerged from the light source 100 and evenly illuminates a liquid crystal panel. The color separation optical system 140 separates a light beam "W" emitted from the illumination optical system 130 into a red light beam "R", a green light beam "G", and a blue light beam "B", and leads the red light beam "R" and the green light beam "G" to the liquid crystal panels 170R and 170G. The relay optical system 150 leads the blue light beam "B", which has a long optical path, to the liquid crystal panel 170B. The three condenser lenses 160R, 160G, and 160B modulate each of the light beams into a light beam that is parallel to its central axis (principal ray). The liquid crystal panels 170R, 170G, and 170B modulate each of the light beams that pass through the condenser lenses according to given image data and serve as optical modulators. The cross-dichroic prism 180 combines each of the modulated color beams. The projection lens 190 expands and projects the combined light beams on a projection screen "SC".

The light source 100 includes a light source lamp 110 having a lamp with high luminance, such as a metal halide lamp, and a reflective mirror 120 having a paraboloid of revolution that emits light emerged from the light source lamp 110 as light beams that are nearly parallel each other.

The illumination optical system 130 includes a first lens array 131, a second lens array 132, a polarization converter 133, and a superimposing lens 134.

Figure 2:
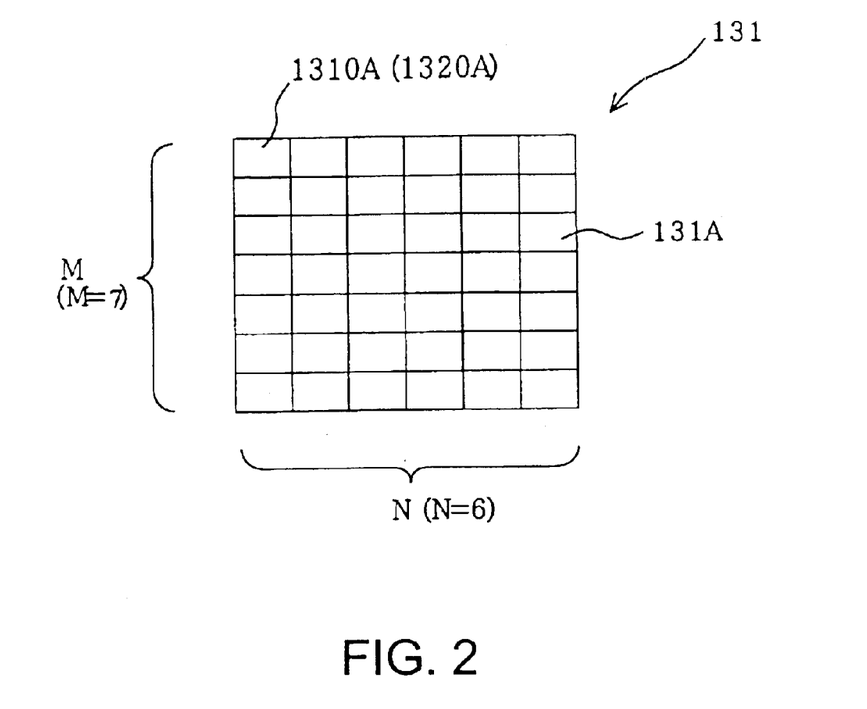
FIG. 2 is a schematic of the first lens array shown in FIG. 1.

FIG. 2 is a plan view of the first lens array.

As shown in FIG. 2, the first lens array 131 is composed of a matrix in which a plurality of small lenses 131A, each of which has an almost rectangular outline, are arranged in M lines and N rows (here, M=7 and N=6). The first lens array 131 is rectangular when seen from the direction of the optical axis of the light source. Each of the small lenses 131A splits light beams that are parallel with each other and emitted from the light source 100, into a plurality of (or M*N) partial beams, and then forms an image of the partial beams in the vicinity of the second lens array 132. The outline of each of the small lenses 131A is shaped to be substantially similar to the areas of the liquid crystal panels 170R, 170G, and 170B in which images are formed. For example, if the aspect ratio (dimensional width-to-depth ratio) of the areas of the liquid crystal panels 170R, 170G, and 170B in which images are formed is 4:3, the aspect ratio of each of the small lenses 131A is set to be 4:3.

Figure 3:
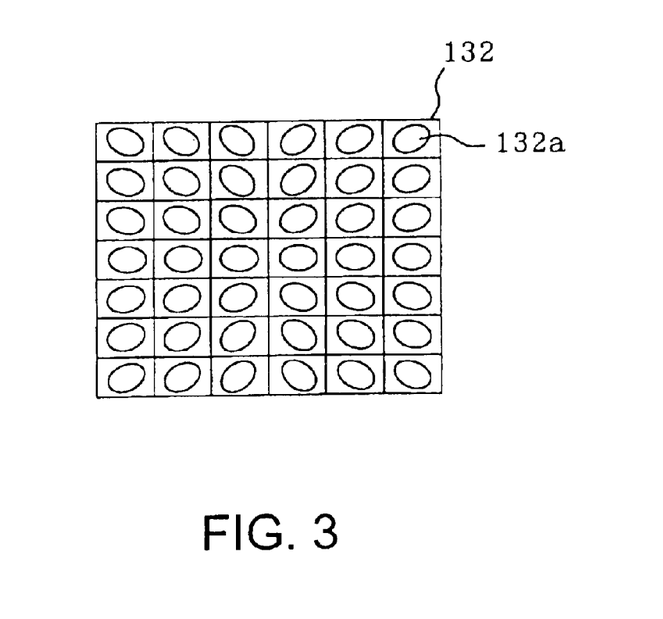
FIG. 3 is a schematic of secondary light source images formed on a second lens array.

The second lens array 132 is composed of a matrix corresponding to the small lenses 131A of the first lens array 131. In this matrix, a plurality of small lenses 132A are arranged in M lines and N rows (here, M=7 and N=6) with no gap between them. Here, the outline of the small lenses 132A of the second lens array 132 is shaped to be substantially similar to the areas of the liquid crystal panels 170R, 170G, and 170B in which images are formed. This is not always necessary unlike the small lenses 131A of the first lens array 131. Thus, the second lens array 132 is rectangular when seen from the direction of the optical axis of the light source. The second lens array 132 is placed in the vicinity of an area where a plurality of partial light beams emitted from the first lens array 131 is focused. In each of the small lenses 132A, secondary light source images 132a arranged in M lines and N rows are formed as shown in FIG. 3.

The polarization converter 133 converts incident light beams to linearly polarized light of one type and emits the converted light.

A plurality of partial light beams split by the first lens array 131 pass through the second lens array 132 and the polarization converter 133 and then enter the superimposing lens 134. The superimposing lens 134 superimposes each of the plurality of partial light beams on the liquid crystal panel 170 and illuminates the panel.

The color separation optical system 140 includes a blue-green reflective dichroic mirror 141, a green reflective dichroic mirror 142, and a reflective mirror 143. The blue-green reflective dichroic mirror 141 transmits a red optical component included in illumination light emitted from the illumination optical system 130, while reflecting blue and green optical components. The red beam "R" passing through the mirror is reflected by the reflective mirror 143 and reaches the liquid crystal panel 170R. After being reflected by the blue-green reflective dichroic mirror 141, the green light beam "G" is reflected by the green reflective dichroic mirror 142 and reaches the liquid crystal panel 170G. As for the blue light beam "B" after being reflected by the blue-green reflective dichroic mirror, the light beam further passes through the green reflective dichroic mirror 142 and enters the relay optical system 150.

The relay optical system 150 is provided in an optical path that leads the blue light beam "B" to the liquid crystal panel 170B. The relay optical system 150 retains the strength of the blue light beam "B" while leading the light beam to the liquid crystal panel 170B. The relay optical system 150 includes a first relay lens 151, a reflective mirror 152, a second relay lens 153, and a reflective mirror 154. The first relay lens 151 focuses light to the second relay lens 153.

The liquid crystal panel 170 serves as an optical modulator by modulating each color light in accordance with image data given by an external control circuit (not shown in the drawings) and forming an image. The dichroic prism 180 combines modulated light beams of each color. Then the projection lens 190 expands and projects the combined light beams on a projection screen "SC". Here, the liquid crystal panel 170 includes liquid crystal packaged between a TFT substrate and an opposing substrate that faces the TFT substrate.

Figure 4:
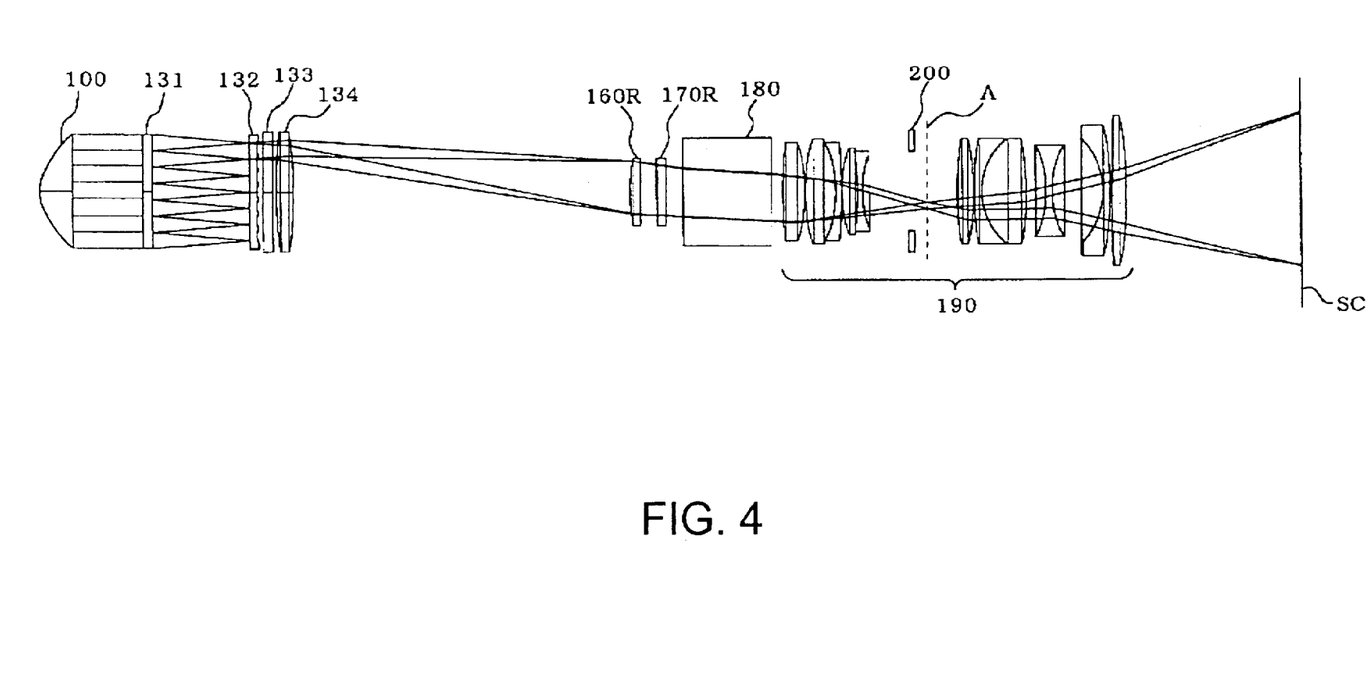
FIG. 4 is a schematic of an optical path of the optical system shown in FIG. 1.

Referring now to FIG. 4, an optical path included in the optical system shown in FIG. 1 will be described.

FIG. 4 illustrates the optical path included in the optical system shown in FIG. 1.

Light emerged from the light source 100 is nearly parallel to the optical axis of the light source. The light first enters the first lens array 131. The light is separated into a plurality of partial light beams by the first lens array 131, and then enters the second lens array 132. Here, the plurality of light source images 132a shown in FIG. 3 are formed. Each of the partial light beams forming the light source images 132a enters the superimposing lens 134 via the polarization converter 133. Then they are overlaid and projected on the liquid crystal panel 170R by the superimposing lens 134.

Here, light is modulated by the condenser lens 160R placed on the input side of the liquid crystal panel 170R to be a light beam that is parallel to its central axis (principal ray) before entering the panel.

The light beam modulated by the liquid crystal panel 170R is combined with other color light beams by the cross-dichroic prism 180 and projected toward a projection screen "SC" by the projection lens 190. In the vicinity of an area "A" conjugated with the second lens array 132, a diaphragm 200 that is a key feature of this invention is provided (a surface in the area "A" on which an image is formed by the second lens array 132 is hereinafter called an image forming surface "A"). The diaphragm 200 will be described in greater detail later.

Figure 5:
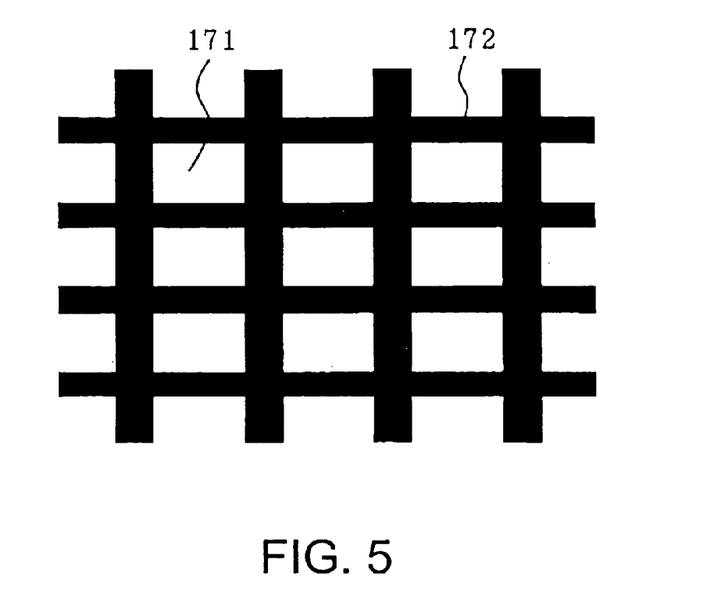
FIG. 5 is a schematic of the configuration of a liquid crystal panel.
Figure 6:
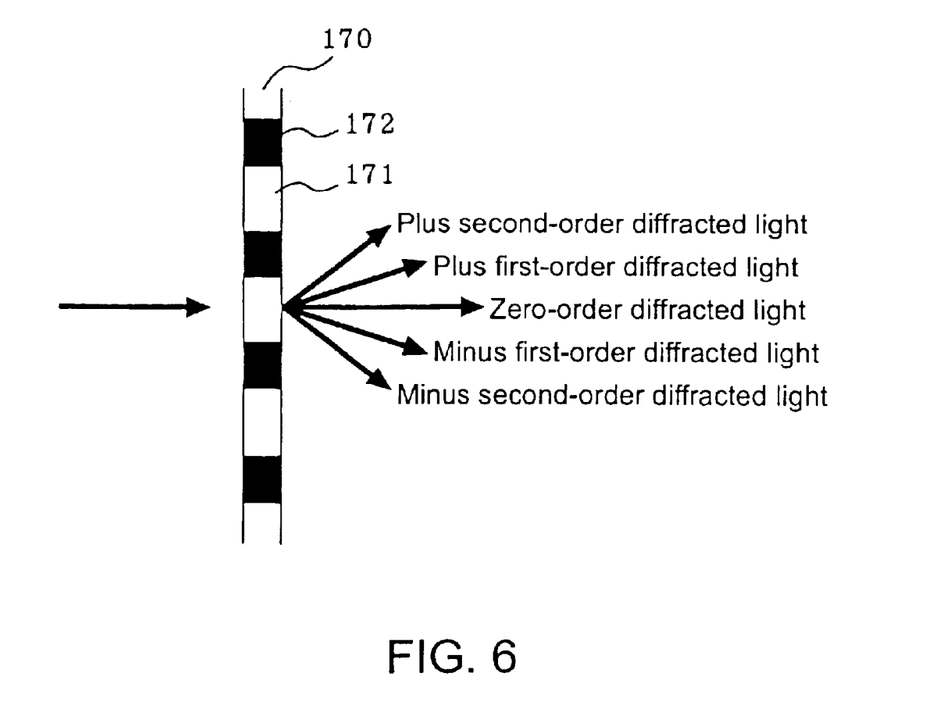
FIG. 6 is a schematic of a liquid crystal panel serving as a diffraction grating.

As shown in FIG. 5, the liquid crystal panel 170 includes a plurality of light transmissive portions 171 that form pixel images and a black matrix 172 that is formed between the light transmissive portions 171 and transmits no light. With this configuration, the liquid crystal panel 170 serves as a diffraction grating. This means that the liquid crystal panel 170 diffracts incident light and emits zero-order diffracted light, plus/minus first-order diffracted light, plus/minus second-order diffracted light, etc. as shown in FIG. 6.

Figure 7:
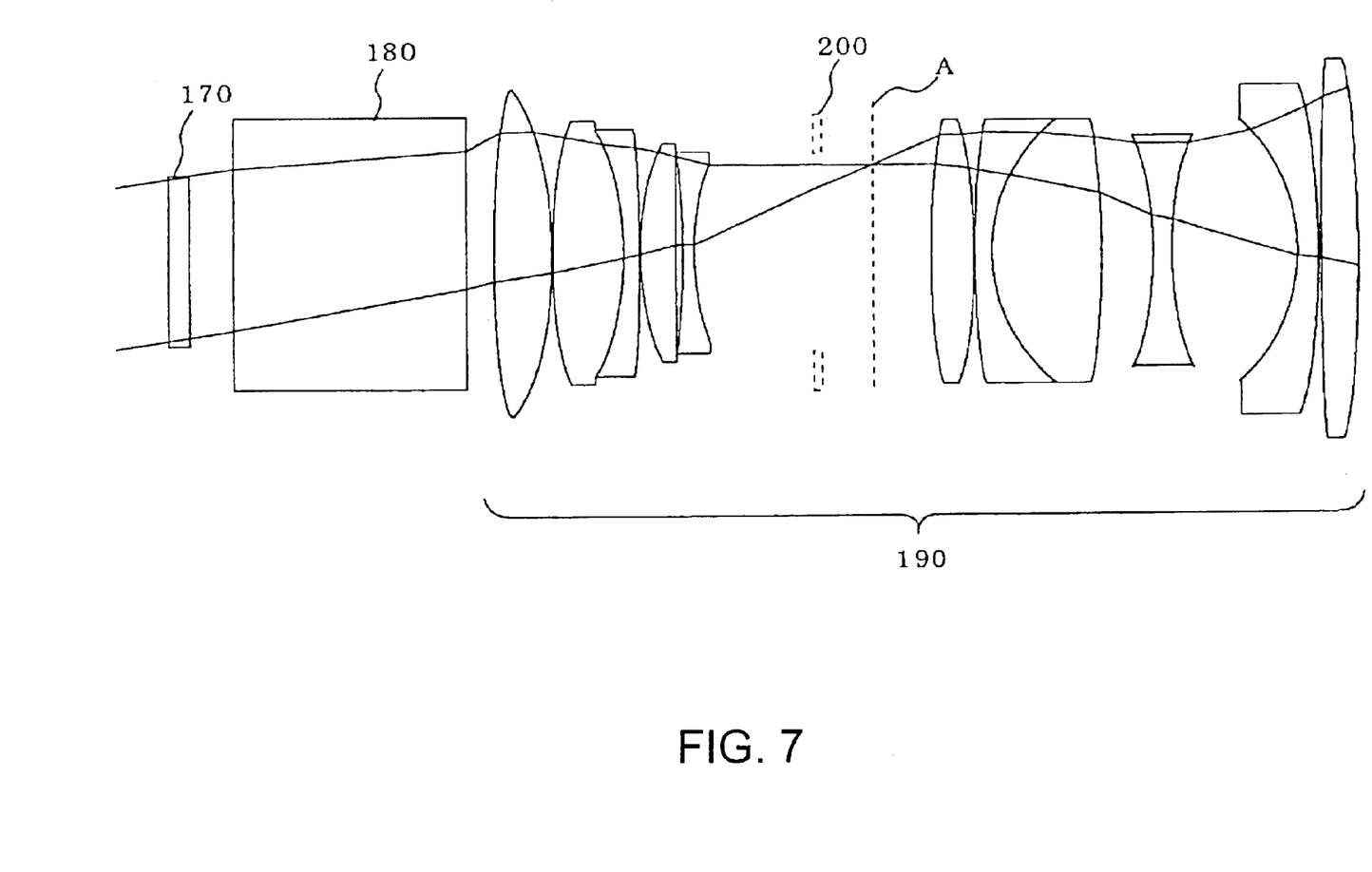
FIG. 7 is a schematic of an optical path of zero-order diffracted light formed by a liquid crystal panel.
Figure 8:
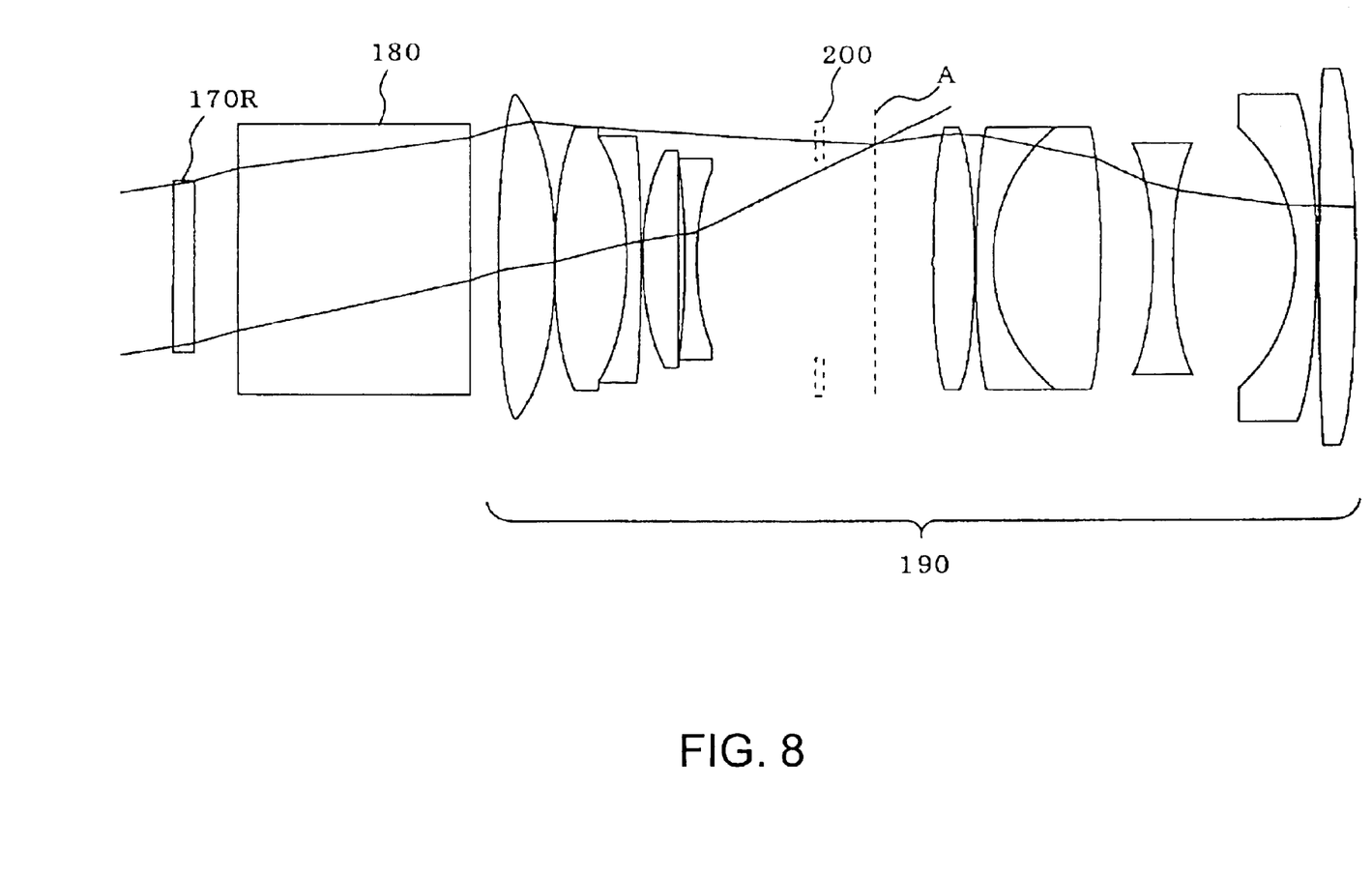
FIG. 8 is a schematic of an optical path of plus first-order diffracted light formed by a liquid crystal panel.
Figure 9:
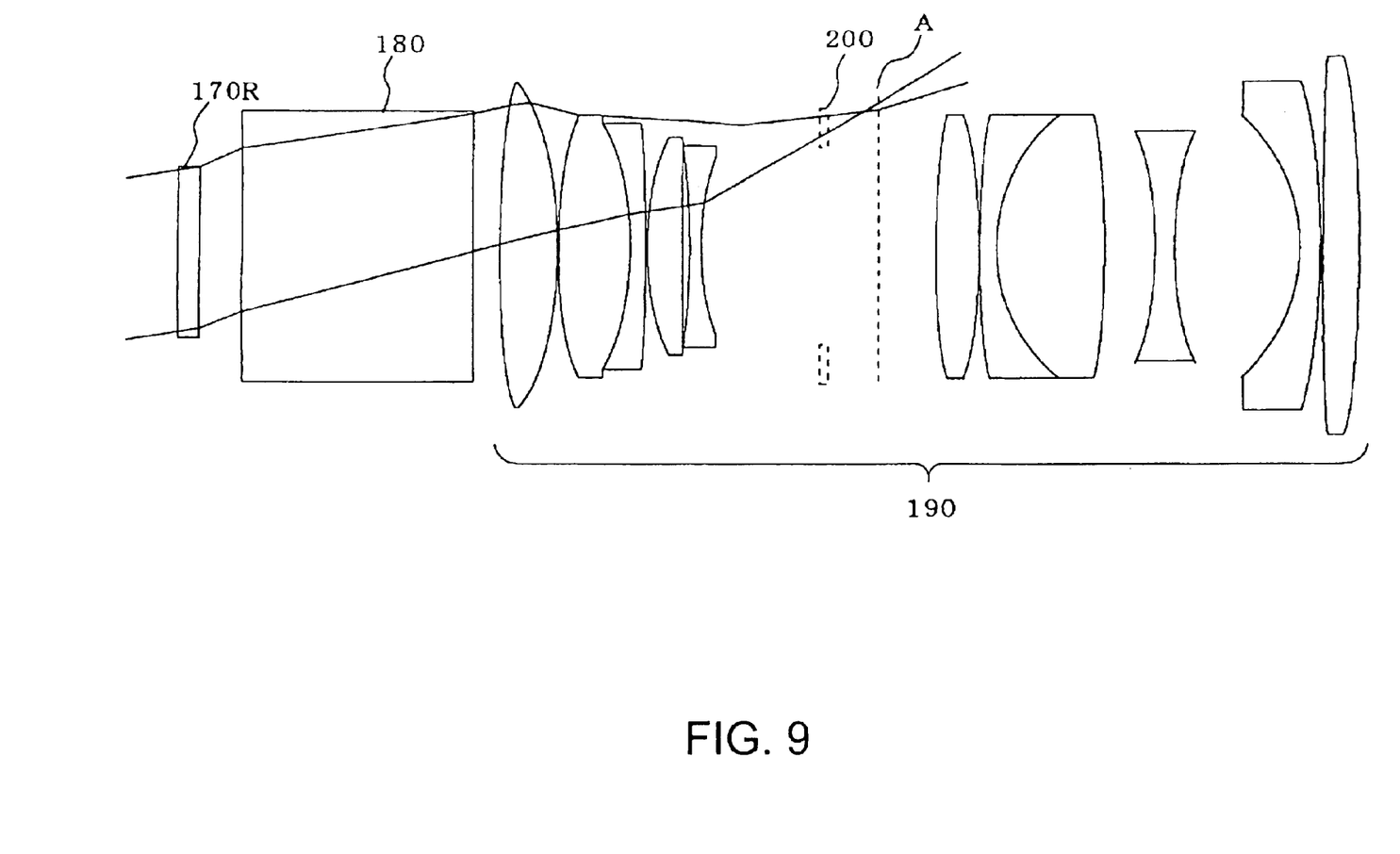
FIG. 9 is a schematic of an optical path of plus second-order diffracted light formed by a liquid crystal panel.

FIGS. 7–9 illustrate an optical path of light passing through the highest one of the small lenses of the first and second lens arrays. Specifically, FIG. 7 shows an optical path of zero-order diffracted light that is diffracted by the liquid crystal panel, FIG. 8 shows that of plus first-order diffracted light. FIG. 9 shows that of plus second-order diffracted light. The diaphragm 200 that will be described in greater detail is shown in FIGS. 7–9 for reference.

FIGS. 7–9 show that an image made by a partial light beam passing through the highest small lens 1310A (1320A) (see FIG. 2) of the first lens array 131 and the second lens array 132 is formed at different positions on the image forming surface "A" in the projection lens 190 depending on the ordinal number of diffracted light. Thus, the partial light beams passing through the small lenses 132A of the second lens array 132 form a plurality of light source images on the image forming surface "A" via the liquid crystal panel 170 that serves as a diffraction grating. Specifically, light source images caused by plus/minus first-order diffracted light and light source images caused by plus/minus second-order diffracted light are formed around light source images formed by zero-order diffracted light. Since the small lenses 132A of the second lens array 132 are arranged in M lines and N rows, light source images caused by plus/minus first- and second-order diffracted light are formed around each of the M*N light source images formed by zero-order diffracted light.

Figure 10:
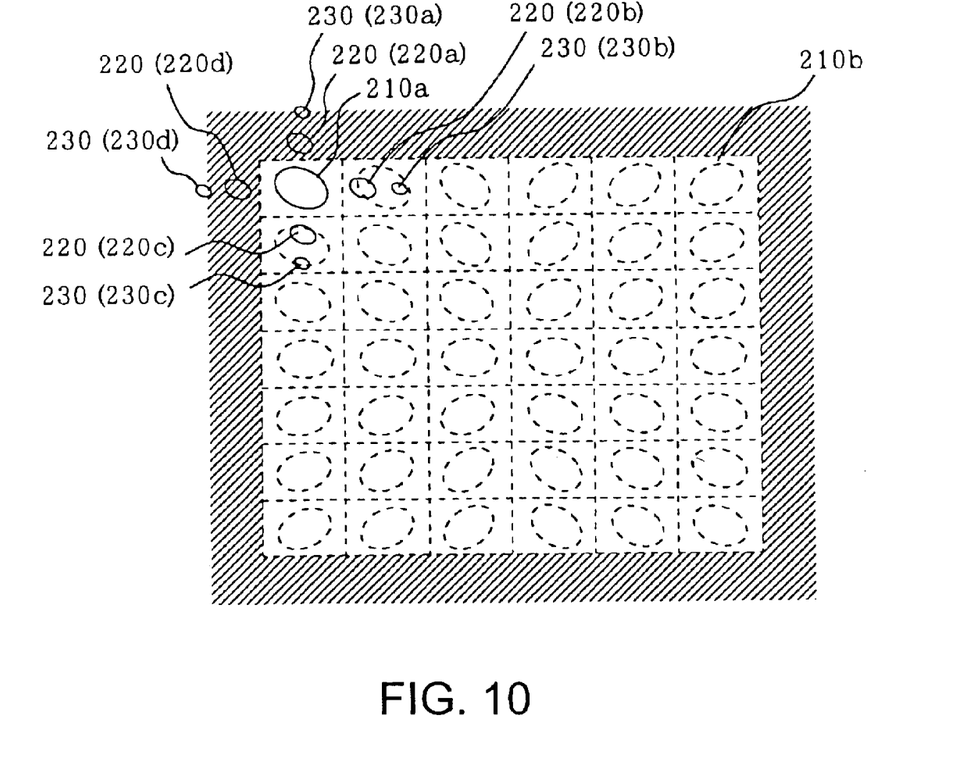
FIG. 10 is a schematic of a plurality of light source images formed on an image forming surface in a projection lens.

FIG. 10 shows a plurality of light source images formed on an image forming surface. In particular, FIG. 10 illustrates a light source image 210a made by a partial light beam passing through the small lens 1320A that is on the upper left side to the optical axis of the light source of the second lens array 132. Dotted lines forming a matrix in FIG. 10 highlight the image formed by the small lens 1320A among the small lenses 132A of the second lens array 132. Dotted light source images 210b shows light source images formed by zero-order diffracted light, specifically, each partial light beam passing through other small lenses of the second lens array 132.

As FIG. 10 shows, the partial light beam passing through the small lens 1320A on the upper left side of the second lens array 132 is diffracted by the liquid crystal panel 170, and thereby forms the light source image 210a with zero-order diffracted light. At the same time, the light beam also forms light source images 220 (220a, 220b, 220c, 220d) caused by first-order diffracted light and light source images 230 (230a, 230b, 230c, 230d) caused by second-order diffracted light around the light source image 210a.

Such diffracted light of high orders of each partial light beam formed by the liquid crystal panel 170 may deteriorate image contrasts. Referring to FIG. 10, the light beams forming the light source images 220a through 220d and the light beams forming the light source images 230a through 230d may harm image contrasts. In addition, partial light beams passing through each of the small lenses, other than the small lens 1320A that are not shown in FIG. 10, are also diffracted by the liquid crystal panel 170, and consequently form light source images caused by diffracted light of high orders around zero-order diffracted light. Here again, diffracted light of high orders causes deterioration to image contrasts. While such diffracted light of high orders may deteriorate image contrasts, those forming light source images in an area surrounded by the hatched area in FIG. 10 play an effective role, contributing to an increase in brightness of projected images. Diffracted light of high orders forming light source images in the hatched area, however, make little contribution to brightness, and there is no significant decrease in brightness even if such light is shielded.

Figure 11:
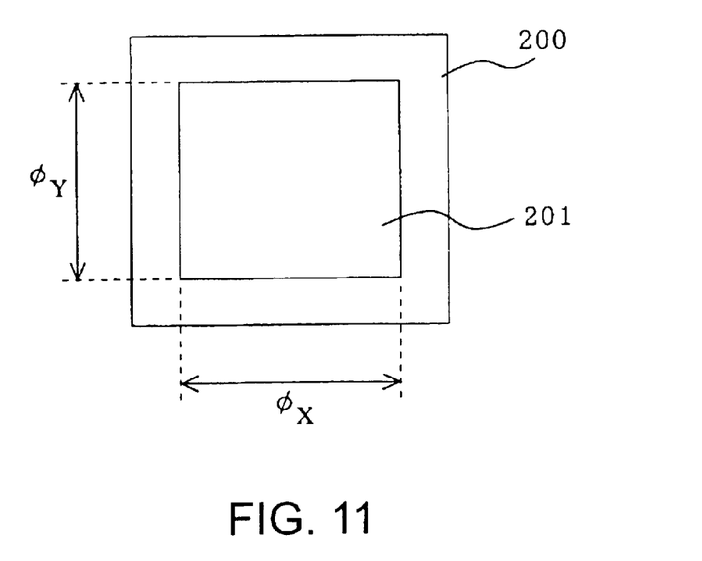
FIG. 11 is a schematic of a diaphragm.

Therefore, this invention enhances contrasts by providing the diaphragm 200 as shown in FIG. 11 in the vicinity of an area where light source images are formed by the second lens array 132, i.e. the area "A" conjugated with the second lens array 132, so as to shield light beams forming light source images in the hatched area.

FIG. 11 shows a diaphragm.

The diaphragm means 200 is made of a plate member having a rectangular opening 201. The size of the opening 201 is set so as to transmit light beams in a matrix of each light source image formed on the image forming surface "A" by zero-order diffracted light of each partial light beam formed by the liquid crystal panel 170, while shielding light beams passing through outside of the matrix. Here, the light beams passing through outside of the matrix refer to, for example, such diffracted light of high orders passing through the hatched area shown in FIG. 10 among other diffracted light of high orders formed by the liquid crystal panel 170, and stray light.

Here, the opening 201 of the diaphragm 200 is rectangular in shape. The opening 201 is shaped to be nearly similar to the outline of the second lens array 132. Since the outline of the second lens array 132 is rectangular in shape in this example, the opening 201 is also set to be rectangular in shape. This is because each light source image made by zero-order diffracted light of each partial light beam formed by the liquid crystal panel 170 is arranged in a shape that is similar to the outline of the second lens array 132, which is a rectangle here. Therefore, by having the opening 201 of the diaphragm 200 shaped to be nearly similar to the outline of the second lens array 132, it is possible to transmit light beams in a matrix of each light source image made by zero-order diffracted light, while shielding light beams passing through outside of the matrix.

The size of the opening 201 of the diaphragm 200 will now be described in detail.

The width $\Phi_X$ and the length $\Phi_Y$ of the opening 201 are determined by the following formulas (1) and (2), respectively.

$$\Phi_X = f/F_X \quad (1)$$

$$\Phi_Y = f/F_Y \quad (2)$$

Note that "f" refers to the focal length of the projection lens 190, "$F_X$" refers to the horizontal F number of the illumination optical system 130, and "$F_Y$" refers to the vertical F number of the illumination optical system 130.

As for the projector 1 of this exemplary embodiment, the F number of the projection lens 190 is set to be almost the same as or smaller than the F number of the illumination optical system 130. Consequently, the projection lens 190 has almost the same brightness as the illumination optical system 130 does.

Figure 12:
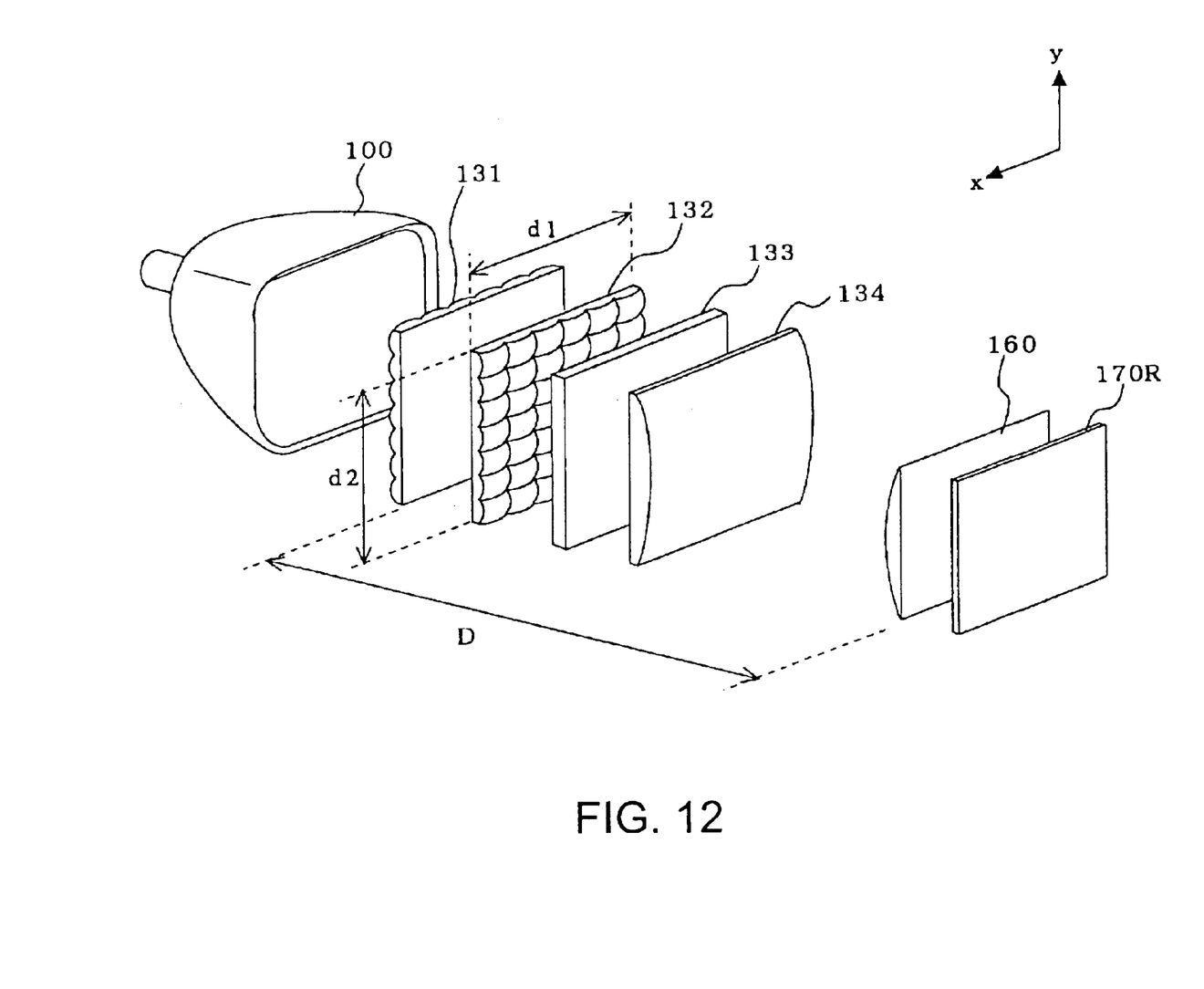
FIG. 12 is a schematic of an illumination optical system for describing the F number of the system.

The F number of the illumination optical system 130 depends on the position of the superimposing lens 134. Referring now to FIG. 12, the F number will be described in detail.

FIG. 12 is a schematic of the illumination optical system 130 for describing the F number of the system. The elements shown in FIG. 12 correspond to those with the same numerals in FIG. 1. The horizontal F number (in the X direction) and the vertical F number (in the Y direction) of the illumination optical system 130 are determined by the following formulas (3) and (4), respectively.

$$F_X = D/(d1/2) \quad (3)$$

$$F_Y = D/(d2/2) \quad (4)$$

Note that "d1" refers to the width in the X direction of the second lens array 132. "d2" refers to the width in the Y direction of the second lens array, and "D" refers to a distance between the second lens array 132 and the condenser lens 160.

The F numbers in the X and Y directions of the illumination optical system 130 are determined by the position of the superimposing lens 134 and the length in the X and Y directions of the second lens array 132. The length and width of the opening 201 of the diaphragm 200 are determined by the F numbers and the focal length of the projection lens 190.

Therefore, by placing the diaphragm 200 having the opening 201 at an area conjugated with the second lens array 132, it is possible to transmit light beams in a matrix of each light source image made by zero-order diffracted light, while shielding light beams passing through outside of the matrix. This enhances image contrasts.

Here, light beams shielded by the diaphragm 200 do not contribute to high picture quality. Therefore, it is possible to provide a projector of high picture quality (with high contrasts) almost without losing brightness.

Figure 13:
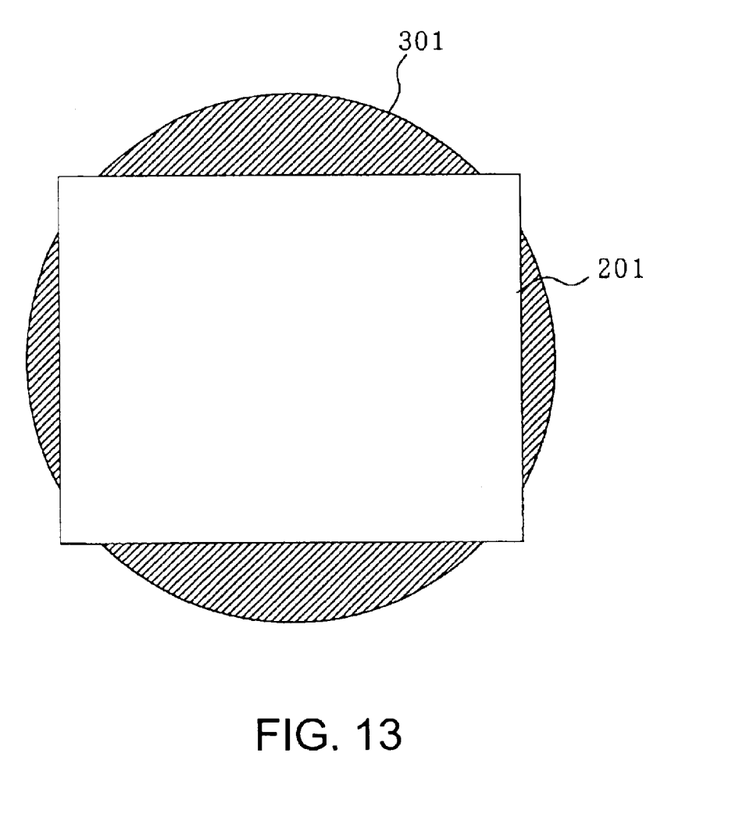
FIG. 13 shows a difference in an area where light is shielded depending on the shape of an opening of a diaphragm.

Compared to a related art diaphragm having a circular opening, a circular diaphragm 301, shown in FIG. 13, transmits light beams in the hatched area unlike the opening 201, which is rectangular, of an aspect of this invention. Such light beams passing through the area may worsen contrasts as mentioned above. Since the opening 201, which is rectangular, shields light beams in the hatched area, it provides higher contrasts than the circular opening 301 does.

According to this exemplary embodiment, high alignment accuracy is not required for the light source 100 (alignment to both a reflector and an optical axis) and for the diaphragm 200, compared to related art methods. Therefore, it is possible to enhance contrasts without causing various problems that deteriorate picture quality, such as reduced brightness, a decrease in an illuminance ratio (a ratio of illuminance at the edge of the liquid crystal panel 170 to illuminance at the center) that shows the degree of illuminance evenness on an illuminated surface, and uneven color.

Also, no requirement for high alignment accuracy can simplify an assembly process, which significantly enhances productivity.

While the diaphragm 200 is made of a plate member having the opening 201 whose area is not adjustable in this exemplary embodiment, the diaphragm 200 may be provided with a mechanism to adjust the size of its opening. This makes it possible to provide projected images best suited for a place where the projector 1 is used by adjusting the area of the opening depending on conditions under which it is used. For example, when using the projector 1 in a bright place where ambient light is available, more importance is attached to brightness than contrast ratios. In this case, the diaphragm 200 is adjusted to have a comparatively large opening. Meanwhile, since more importance is attached to contrast ratios than brightness when it is used in a dark room, the diaphragm 200 is adjusted to have a comparatively small opening.

Figure 14A:
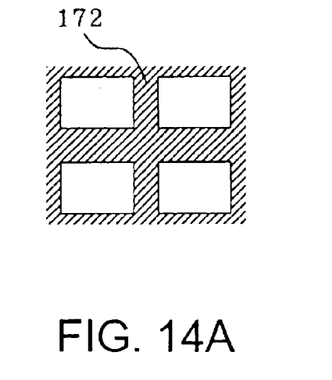
FIG. 14 shows differences in projected images when defocused depending on the shape of an opening of a diaphragm.
Figure 14B:
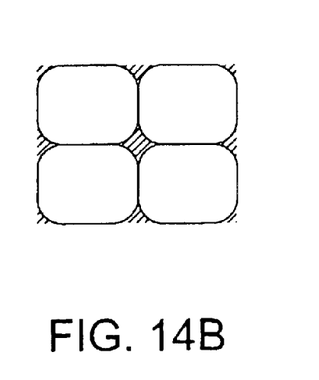
Figure 14C:
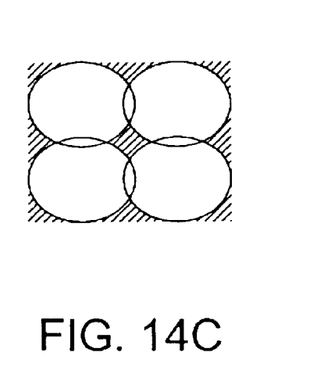

When projecting an image of the liquid crystal panel 170, the black matrix 172 is also expanded and displayed. This appears on a projection screen as black lines in a matrix, which obstruct the view, as shown in the partially enlarged view of a projected screen, FIG. 14A. Such lines caused by the black matrix 172 do not appear on a screen by making an opening of the diaphragm 200 rectangular, since each pixel image is extended in the shape of a rectangle when defocused as shown in FIG. 14B. This makes it possible to project images without obstruction. When using a diaphragm having a circular opening, each pixel image is extended in the shape of a circle when defocused, as shown in FIG. 14C. This causes overlapping of pixel images. As a result, an intended image cannot be successfully projected.

While the diaphragm of an aspect of the invention is provided with the projector 1, which is transmissive in this exemplary embodiment, the invention is also applied to a reflective projector. Here, "transmissive" refers to that an optical modulator, such as a liquid crystal panel transmits light, while "reflective" refers to that an optical modulator, such as a liquid crystal panel reflects light. When the invention is applied to a reflective projector, it also provides the same effects when applied to a transmissive projector.

While the liquid crystal panel is used as an optical modulator in this exemplary embodiment, a micromirror may replace the liquid crystal panel, for example. The invention is also applied to a projector using a micromirror.

Moreover, a front-projection projector that projects images from the side on which the images are viewed is used in this exemplary embodiment, the invention is also applied to a rear-projection projector that projects images from the opposite side to the side on which the images are viewed.

Also in the exemplary embodiment described above, an example where the invention is applied to a three-panel projector that is equipped with three liquid crystal panels is shown. The invention can be also applied to a two- or four-panel projector that is equipped with two or four liquid crystal panels, for example.

What is claimed is:

1. A projector, comprising:
    a light source;
    a first lens array that splits light emitted by the light source into a plurality of partial light beams with a plurality of small lenses that are arranged in a matrix;
    a second lens array including a plurality of small lenses that are corresponding to the plurality of small lenses of the first lens array;
    a superimposing lens that superimposes a plurality of partial light beams emitted by the first lens array and the second lens array on an optical modulator;
    a projection lens that projects light modulated by the optical modulator; and
    a diaphragm having an opening that is shaped to be substantially similar to an outline of the second lens array being provided in the vicinity of an area conjugated with the second lens array.

2. The projector according to claim 1, the opening of the diaphragm being almost rectangular in shape.

3. The projector according to claim 1, the optical modulator including a black matrix and serving as a diffraction grating, and the diaphragm shielding light passing through outside of a matrix of each light source image that is formed in an area conjugated with the second lens array by zero-order diffracted light of each of the partial light beams formed by the optical modulator.

4. The projector according to claim 3, the diaphragm including the opening whose width $\Phi X$ and length $\Phi Y$ are determined by the formulas below when seen from a direction of an optical axis of the light source:

$$\Phi X = f/Fx;$$

$$\Phi Y = f/FY;$$

wherein "f" refers to focal length of a projection lens, "Fx" refers to a horizontal F number of an illumination optical system including the first lens array, the second lens array, and the superpostion lens, when seen from the direction of the optical axis of the light source, and "FY" refers to a vertical F number of the illumination optical system when seen from the direction of the optical axis of the light source.

5. The projector according to claim 1, the diaphragm being made of a plate member having the opening.

6. The projector according to claim 1, the diaphragm including a mechanism so as to adjust an area of the opening.

7. The projector according to claim 1, optical modulator being a liquid crystal panel including liquid crystal sealed between a substrate having thin-film-transistors and an opposing substrate that faces the substrate having thin-film-transistors.

* * * * *